Oct. 24, 1944. R. N. ROWE Re 22,559

FRONT OPERATED SWITCH

Original Filed Oct. 12, 1938 2 Sheets-Sheet 1

INVENTOR
RAYMOND N. ROWE,
BY
ATTORNEY

Oct. 24, 1944. R. N. ROWE Re 22,559

FRONT OPERATED SWITCH

Original Filed Oct. 12, 1938 2 Sheets-Sheet 2

INVENTOR
RAYMOND N. ROWE,
BY
R. S. Allyn
ATTORNEY

Reissued Oct. 24, 1944

Re. 22,559

UNITED STATES PATENT OFFICE 22,559

FRONT OPERATED SWITCH

Raymond N. Rowe, Plainville, Conn., assignor to The Trumbull Electric Manufacturing Company, Plainville, Conn., a corporation of Connecticut Original No. 2,213,657, dated September 3, 1940, Serial No. 234,528, October 12, 1938. Application for reissue November 28, 1941, Serial No. 420,866

10 Claims. (Cl. 200—172)

This invention relates to front operated switches, particularly to switches with dust proof enclosures.

One object of my invention is to provide a type of switch box with an external operating handle which can be used to receive any suitable form of lever actuated switch.

Another object is to provide switch throwing mechanism that is adapted to be used with a preassembled type of snap switch mechanism.

Another object is to provide an enclosed switch construction that can be actuated equally well with the cover either open or closed.

Another object is to provide a front operated enclosed switch in which the external switch throwing handle and associated parts are mounted on the cover of the box or receptacle and yet do not interfere with the closing of the cover regardless of the position of the switch parts.

Another object is to provide a front operated enclosed switch in which the external switch throwing handle and associated parts are carried by the cover and movable therewith without disturbing the interior switch parts.

Another object is to provide a front operated enclosed switch with means for operatively connecting the external operating handle to the internal switch throwing mechanism while the cover is closed on the box.

Another object is to provide a front operated enclosed switch with automatic means for moving the external switch throwing handle and associated parts to an "off" position upon the opening of the cover.

Another object is to provide switch throwing mechanism that is easily assembled and disassembled.

Another object is to provide such switch actuating mechanism that is simple and compact in construction and positive and certain in action.

Another object is to provide such a front operated enclosed switch in which the cover and the external switch throwing mechanism form a unitary structure.

In the preferred form of my invention, the box is of a conventional form but provided with a handle pivoted on the front of the cover and a movable member on the inside of the cover connected to the handle and provided with parts adapted to coact with the operating lever of a switch unit mounted inside of the box in such a way as to permit the cover to be closed regardless of the position of the interior lever and to ensure automatic operative connection of the outside handle with the interior lever when the exterior handle is moved to a position to correspond with the position of the lever.

Figure 1:
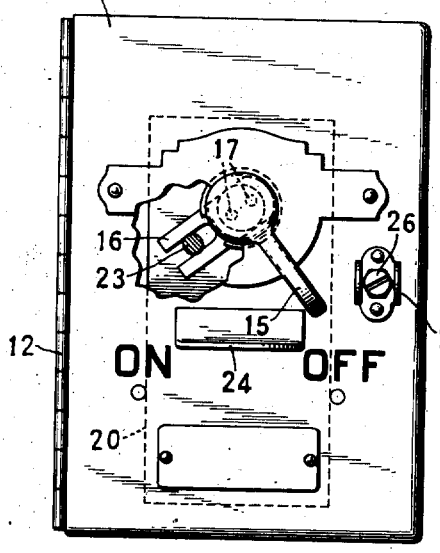
Fig. 1 is a front view of an enclosed front operated switch embodying one form of my invention, with part of the cover being broken away to show part of the switch throwing mechanism.
Figure 2:
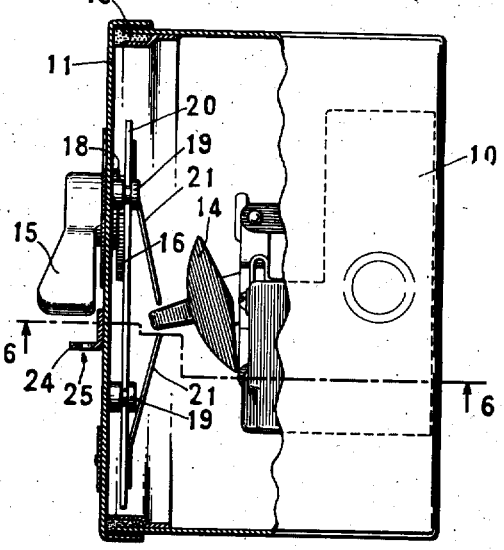
Fig. 2 is a side view with part of the box being broken away to show the interior, the parts being shown in their operative relation.
Figure 3:
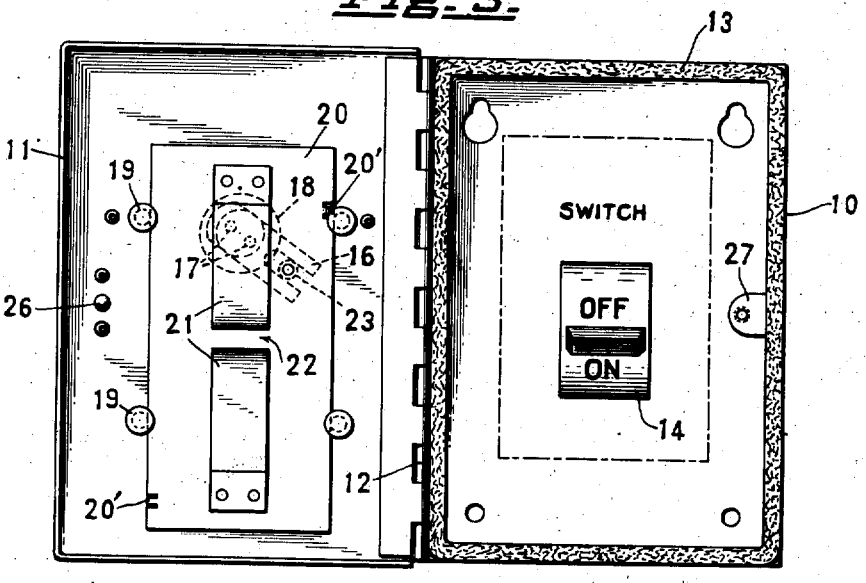
Fig. 3 is a front view of the switch with the cover open to show the switch throwing mechanism carried on the inside of the cover, the details of the switch per se being omitted.
Figure 4:
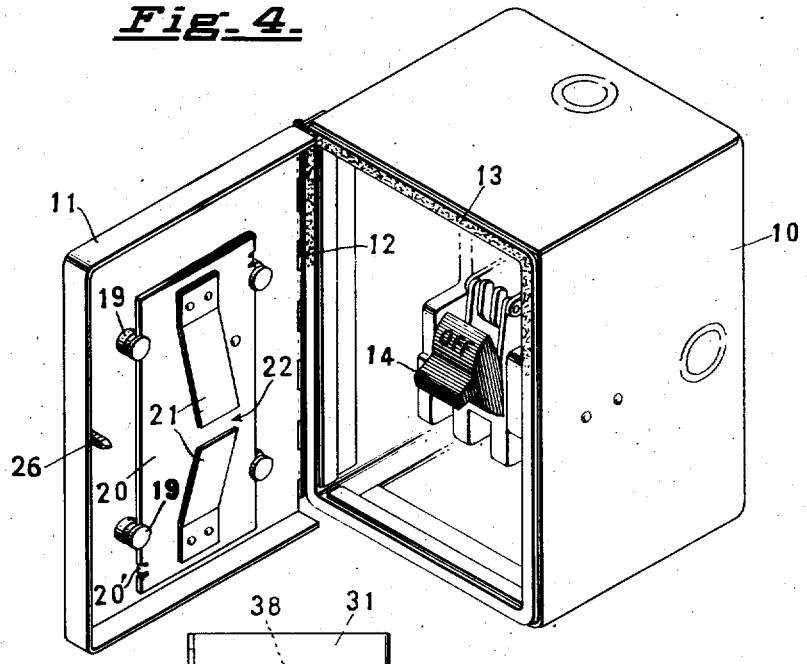
Fig. 4 is a perspective view of my improved switch with the cover open.

In the form of my invention shown the box 10 has a cover 11 hinged at 12. The top edge of the box is provided with a felt or other suitable gasket 13 to prevent dust etc. from entering into the box when the cover is closed.

The switch proper may be of any suitable type with its own contacts and conventional quick make and quick break mechanism actuated by a pivotally mounted lever or finger piece 14 such as that shown in the patents to B. E. Getchell No. 1,886,477 or No. 1,831,239 or of the circuit breaker type of the Rowe patents, No. 2,102,545 or No. 2,126,412 and suitably mounted in the body of the box.

A switch throwing handle 15 is pivoted to the cover on the outside and is connected to the arm 16 inside by means of a pair of pins or studs 17 which extend inwardly through the cover and pass through a washer or disc 18 interposed between the arm 16 and the cover.

Inside of the cover 11 and slidably or otherwise suitably supported by grooved studs 19 is a plate 20. Carried by this plate are two spring arms 21, one end of each arm being fixed to the plate and its other end being free and normally bent away from the plate with a space 22 between the free ends of the arms.

The bifurcated lever or arm 16 is arranged on the inside of the cover and its bifurcated end engages a stud 23 on plate 20 at one side of its center line.

The plate 20 may have outstruck ears 20′ on opposite edges to limit movement of the plate in either direction.

When the parts are in operative relation the tip of the lever 14 extends into the space 22 between the ends of the arms 21 so that by swinging the handle 15 from one side to the other the switch may be actuated.

The outermost portions of the spring arms 21 extend into the box beyond the outermost end of the finger piece 14 when the cover is closed and being of spring material yield when and if they come into contact with the end of the finger piece upon the closing of the cover. The arm 21 contacting the top of the lever or finger piece 14 upon closing the cover may be slid along it by the handle 15 until the arm slides off the lever 14 and the arms 21 become interlocked with said lever 14. Further movement of the handle 15 will move the finger piece 14 and the switch parts to either "on" or "off" position.

The arrangement of the parts preferably is such that upon opening movement of the cover, the weight of the parts will cause the plate and connected parts to fall by gravity to the "off" circuit position of Fig. 1. This automatically places the switch throwing mechanism in proper position for operative connection with the switch actuating finger piece 14 which ordinarily will have been thrown to "off" circuit position before the opening of the cover.

Figure 5:
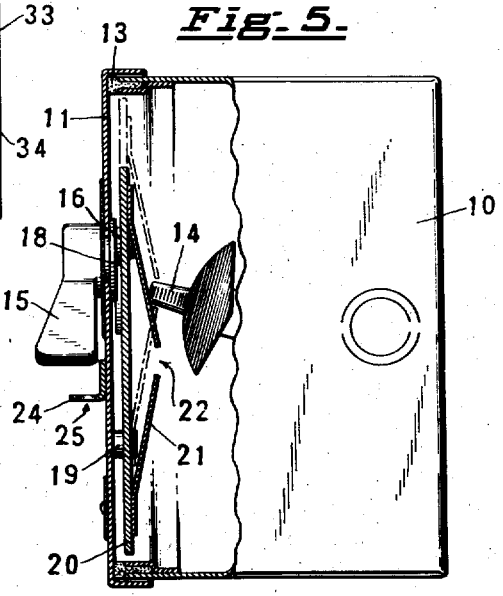
Fig. 5 is a view similar to Fig. 2 but showing the cover closed with the inside switch lever in the "on" position while the external handle is in the "off" position.
Figure 6:
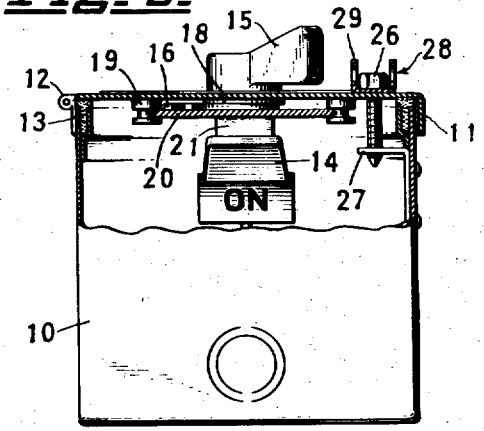
Fig. 6 is a transverse section generally on the plane of the line 6—6 of Fig. 2.

From Fig. 5 it will be seen that the cover can be closed even with the finger lever 14 in the "on" position. The handle 15 may then be moved to the "on" position. The handle 15 may then be moved to the "on" position in which the spring arms 21 will snap into connection with the lever 14.

A guard member 24 having an opening 25 for receiving a padlock or seal (not shown) may be provided to secure the handle 15 if desired. The cover 11 may be held closed on the box by a screw 26 which is adapted to engage a screw threaded lug 27 on the inside of the box. The cover may be sealed to the box by a padlock or seal (not shown) passing through the openings 28 in the spaced lugs 29 directly over the head of screw 26.

It will be understood that the improved switch throwing mechanism may be used to actuate the movable switch member of any type of switch or circuit breaker which is operated by a front lever or toggle type handle.

The spring arms 21 permit the cover to be closed regardless of the position of the handle 15 or of the lever 14 because the arms yield and ride over the projecting end of the finger piece if not in their proper operative positions and will automatically interlock as soon as the handle 15 is moved sufficiently.

Figure 7:
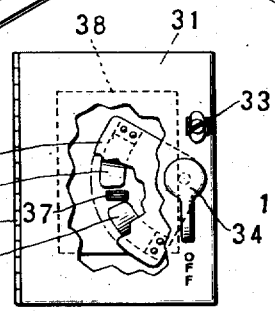
Fig. 7 is a front view, on a reduced scale, showing a modification of my invention, parts being broken away to show the interior.

In the modification shown in Figure 7 there is a box with a cover 31, hinged at 32, and with a conventional cover catch or screw 33 for holding the cover closed. A handle 34, similar to the handle 15 of the other form, is pivoted on the outside of the cover, and fixed to this handle is a plate 35 on the inside of the cover. Pivotal movement of the handle will result in direct arcuate movement of the plate 35.

Secured to this plate are two spring arms 36, which are similar to the spring arms 21, with their free ends bent away from the plate and spaced from each other to receive the lever or finger piece 37 of a switch 38. In this form, as in the other, in which the device is installed, as usual gravity will urge the switch throwing mechanism to the "off" position illustrated in Figure 7. The spring arms will allow the cover to be closed even if the position of outer handle and inner lever do not coincide, and will also snap into engagement with the switch lever 37 when they are moved to proper position.

The box 10 and its openable hinged cover constitutes a housing for the switch or circuit interrupter. The actuating handle or lever 14 is pivoted in any suitable manner so that it may be oscillated by the rotative action of the operating handle 15. The sliding plate 20 has the opposed, inclined resilient or yielding arms 21 which interengage with the tip of the handle 14 to constitute a separable connection between the handles which is operable after the cover is closed to establish an operative connection between the handles by manually moving the operating handle to a position corresponding to that of the actuating handle irrespective of any initial difference of position of the handles.

I claim:

1. A front actuated enclosed switch including a box open at the front and having a cover hinged at one edge, switch mechanism mounted in the box and having an actuating lever with a free end projecting toward the cover, a carrier movably supported by the cover at the inside of the cover, and movable therewith, spring pressed members carried by said carrier and having a space to receive the free end of the lever when the cover is closed, said members and said lever having coacting surfaces outside of said space shaped so that when the cover is closed said members will yield upon engaging said lever, and an external handle at the front of the cover connected to said carrier and moving the same to engage the lever in said space.

2. In a front actuated switch, a box having a cover hinged thereto, switch mechanism within the box having an operating lever with an end projecting toward the cover, an actuating handle carried by the cover at the outer face thereof, a connecting device mounted on the inside of the cover and connected to the handle and including means at least a part of which is spring pressed toward the lever when the cover is closed, said means having a space to receive the end of the lever in certain positions, at least a part of said means engaging the lever and yielding toward the cover in case the cover is closed when the space is not in position to receive the end of the lever.

3. In a front actuated switch, a box having a cover hinged thereto, switch mechanism within the box having an operating lever with an end projecting toward the cover an actuating handle carried by the cover at the outer face thereof, a connecting device mounted on the inside of the cover and connected to the handle and including means at least a part of which includes a flat inclined spring with a movable end, said means having a space adjacent said end to receive the end of the lever, said spring engaging the lever and yielding toward the cover in case the cover is closed when the space is not in position to receive the end of the lever.

4. In a switch, a box having a cover hinged thereto, a circuit breaker in the box having a lever projecting toward the cover, a handle pivoted to the cover and movable therewith, a carrier mounted on the inside of the cover and connected to the handle, spring pressed connecting means carried by said carrier and normally pressed toward and engaging the lever when the cover is closed, said carrier, said handle and said connecting means being so balanced as to automatically move to the "off" position when the cover is opened and the handle released, said connecting means yielding toward the cover when the cover is closed while the lever is in the "on" position and the handle is in the "off" position.

5. An enclosed switch including a box, a movable cover for said box, switch mechanism in the box including a pivoted finger piece for moving the movable switch member, a movable handle on the outside of said cover and means of connection between the handle and finger piece whereby said finger piece is actuated, said means including a member on said handle extending interiorly of the cover, a plate movably supported on the inside of said cover and operatively connected to said handle, a pair of projections carried by said plate and adapted to be moved into position to actuate said finger piece and means to limit the movement of the plate, a spring arm support for at least one of the projections adapted to yield when the cover is closed while the finger piece is in the "on" position and the handle is in the "off" position, said plate being then movable by means of the external handle to the "on" position so as to position the projections on opposite sides of the switch lever.

6. An enclosed switch including a box, a movable cover for said box, switch mechanism in the box including a finger piece protruding from said mechanism for moving the movable switch member, a movable handle on the outside of said cover and normally disengageable means of connection between the handle and finger piece whereby said finger piece is actuated, said handle and means of connection being adapted to be automatically moved to "off" circuit position upon the opening of the cover, said means of connection including two projections carried by the cover at least one of which consists of a spring arm adapted to yield when the cover is closed in case the finger piece is in a position to otherwise obstruct the movement of the cover.

7. An enclosed switch including a box, a movable cover for said box, switch mechanism in the box including a finger piece for moving the movable switch member, a movable handle on the outside of said cover and means of connection between the handle and finger piece whereby said finger piece is actuated including a slidable plate carried by the cover and adapted to be moved by gravity to "off" position upon the opening of the cover whereby the operating handle is moved to "off" position, said plate having two projections with a space between them to normally receive the tip of the finger piece, at least one of said projections having a spring arm adapted to yield to permit the plate to be moved to a position in which the tip of the finger piece can be received between the projections if the cover is closed when the finger piece is in line with the spring arm.

8. An enclosed switch including a box, a movable cover for said box, switch mechanism in the box including a finger piece for moving the movable switch member, a movable handle on the outside of said cover and means of connection between the handle and finger piece whereby said finger piece is actuated, said means including a member on said handle extending interiorly of the cover, an arm fast to said extension member, a plate slidably supported on the inside of said cover and operatively connected to said arm and a pair of spaced spring arms carried by said plate and adapted to be moved into position to engage said finger piece, said plate and first named arm being so arranged that the movable handle and associated parts are automatically moved to "off" position upon the opening of the cover, said arms being resilient and yieldable to permit proper connection between the arms and the finger piece should the cover be closed when the arms are not in position to normally engage the finger piece.

9. An enclosed switch including a box, a movable cover for said box, switch mechanism in the box including a pivoted finger piece protruding from said mechanism for moving the movable switch member, a movable handle on the outside of the cover and means of connection between the handle and finger piece whereby said finger piece is actuated, said means including a member on said handle extending interiorly of the cover, a slidable plate operatively connected to the handle and a pair of spring arms carried by said plate, each spring arm having one end fixed to said plate and its other end extending freely outwardly and toward the other arm, the free ends of said spring arms being spaced from each other to receive the finger piece between them, said spring arms when the cover is closed being arranged so as to engage said finger piece and so as to be moved into interlocking engagement with the finger piece by the outside handle whereby movement of the plate will move the finger piece, said arms being yieldable to permit the cover to be closed even when the finger piece is not in a position to fit between the ends of the arms, said arms permitting proper connection of the arms and the finger piece by moving the slidable plate after the cover is closed should the cover be closed when the parts are not in position to automatically engage.

10. A box for containing an electric switch having a pivoted actuating lever, said box having a body portion adapted to support the switch in a position with its actuating lever projecting forwardly, a cover hinged to one edge of the box body, a handle pivoted to the cover on an axis perpendicular to the plane of the cover, a plate mounted on the inside of the cover and connected to the handle so that the handle may move the plate, two spring arms carried by the plate and having free ends spaced apart from each other to receive the end of the actuating lever of the switch when in place, said arms permitting proper engagement of parts should the cover be closed when they are not in position to engage automatically.

RAYMOND N. ROWE.